(12) United States Patent
Landy et al.

(10) Patent No.: US 7,380,479 B2
(45) Date of Patent: Jun. 3, 2008

(54) STEERING WHEEL COVER

(75) Inventors: Richard J. Landy, Castaic, CA (US); Eric M. Peterson, Yorba Linda, CA (US)

(73) Assignee: Plasticolor Molded Products, Inc., Fullerton, CA (US)

( * ) Notice: Subject to any disclaimer, the term of this patent is extended or adjusted under 35 U.S.C. 154(b) by 0 days.

(21) Appl. No.: 11/594,547

(22) Filed: Nov. 8, 2006

(65) Prior Publication Data

US 2008/0105076 A1    May 8, 2008

(51) Int. Cl.
    *G05G 1/10*      (2006.01)
(52) U.S. Cl. ........................................ 74/558
(58) Field of Classification Search ................ 74/552, 74/558, 558.5
See application file for complete search history.

(56) References Cited

U.S. PATENT DOCUMENTS

| | | | | |
|---|---|---|---|---|
| 1,928,455 A | * | 9/1933 | Leef | 223/103 |
| 2,157,950 A | * | 5/1939 | Best | 74/558 |
| 2,226,866 A | * | 12/1940 | Lipschultz | 74/558 |
| 2,309,374 A | * | 1/1943 | Samuel | 74/558 |
| 2,618,987 A | * | 11/1952 | Goldstine | 74/558 |
| 3,945,416 A | * | 3/1976 | Rim | 74/558.5 |
| 4,800,776 A | * | 1/1989 | Strongwater | 74/558 |
| 5,743,154 A | | 4/1998 | Jacinth | |
| 5,848,559 A | | 12/1998 | Harrill | |
| 6,748,822 B2 | | 6/2004 | Hussy | |
| 2004/0182195 A1 | * | 9/2004 | Bateman | 74/558 |
| 2004/0226400 A1 | * | 11/2004 | Proudfit | 74/558 |

FOREIGN PATENT DOCUMENTS

JP      62257476 A    *   11/1987

* cited by examiner

*Primary Examiner*—Vicky A Johnson
(74) *Attorney, Agent, or Firm*—Harold L. Jackson

(57) ABSTRACT

A steering wheel cover in the form of an elongated endless resilient member or band with an endless bungee cord secured along each lateral edge. The cover has a substantially flat relaxed state, for packaging and display purposes, from which state the member may be stretched to a limited extent to allow a central portion of the band to extend around the periphery of the steering wheel rim with the lateral edges extending inwardly beyond the cross-sectional center point of the rim with the bungee cord being placed in tension to retain the cover in place.

7 Claims, 4 Drawing Sheets

STEERING WHEEL COVER

FIELD OF THE INVENTION

This invention relates to a steering wheel cover for covering the peripheral rim of a steering wheel.

BACKGROUND OF THE INVENTION

Steering wheels are a common item in almost all motor vehicles (excluding motorcycles) and are formed in the shape of a circular ring or rim supported by a hub attached to a steering shaft. The circular ring or rim of steering wheels, being gripped by a driver's hands is subjected to considerable wear and accumulated dirt and debris as the vehicle is used. Steering wheel covers are in common use to mitigate many of such problems as well as improving the aesthetic appearance of the wheel. An example of a steering wheel 10 having a hub 10a and a rim 10b is illustrated in FIG. 1.

One common prior art cover 12 is in the form of an endless strap of non-flexible material, which is arranged to be positioned over a major portion of the circumference of the rim. See FIG. 2. The lateral edges are then sewn or stitched together by the motorist via thick thread or cord 12a, to substantially encompass the rim leaving spaces for the joinder of the rim to the hub. The illustrated steering wheel includes G.M.'s famous bow tie Chevrolet trademark. While this type of cover serves to protect the rim and may add ambience to the steering wheel, the sewing or stitching procedure is time consuming rendering the cover not particularly user friendly.

Another common prior art cover 14, shown in FIGS. 3 and 4, is in the form of an endless band of flexible, but not stretchable material, e.g., cloth 14a, with the material looped and sewed, via thread, along each outside lateral edge to enclose a circular or endless rubber band (not shown). To ensure that the rubber band has sufficient strength to firmly maintain the cover on the steering wheel rim it must be relatively thick which results in the cover forming a bunched oblong shape in its relaxed state (FIG. 4) and requires considerable stretching force to be placed around the steering wheel rim. Again, the installation of this type of cover is not particularly user friendly. In addition, the cover in its relaxed bunched up state does not lend itself to a compact package for display purposes. Further, the rubber band, in it's stretched state, is subjected to considerable tensile force resulting in the tendency of the band to break over time.

Other types of prior art steering wheel covers are described in U.S. Pat. Nos. 6,748,822; 5,743,154; and 5,848,559. Each of these patented covers have their own shortcomings such as cost, etc. There is a need for a steering wheel cover which overcomes these shortcomings.

SUMMARY OF THE INVENTION

A steering wheel cover, in accordance with the present invention, comprises an elongated, endless member, such as a band, having opposed lateral free edges. An endless bungee cord is secured along each lateral edge as by forming a seam along each edge enclosing the cord.

The cover has a substantially flat, relaxed state from which state the member may be stretched to a limited extent so that the central portion of the band extends around the periphery of the rim with the lateral edges extending inwardly beyond the cross-sectional center point of the rim with the bungee cord being placed in tension to retain the cover in place.

DESCRIPTION OF THE PREFERRED EMBODIMENT

Figure 2:
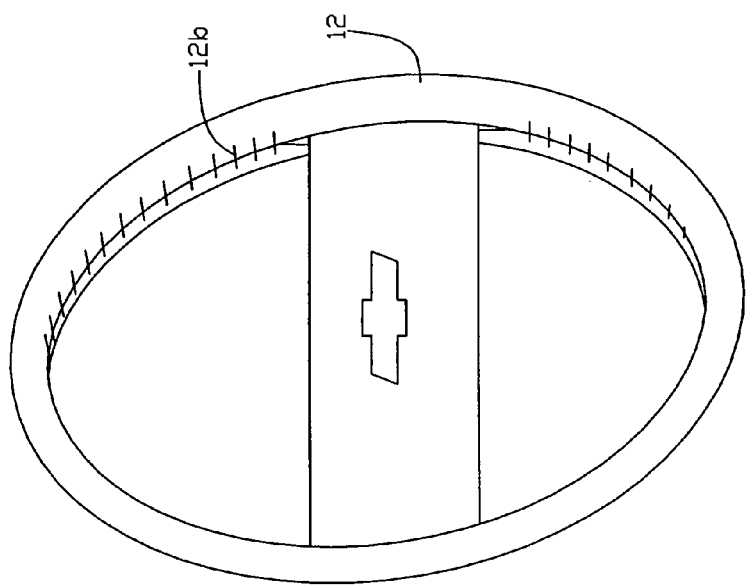
FIG. 2 is a perspective view of the steering wheel with a common prior art cover secured thereover.
Figure 1:
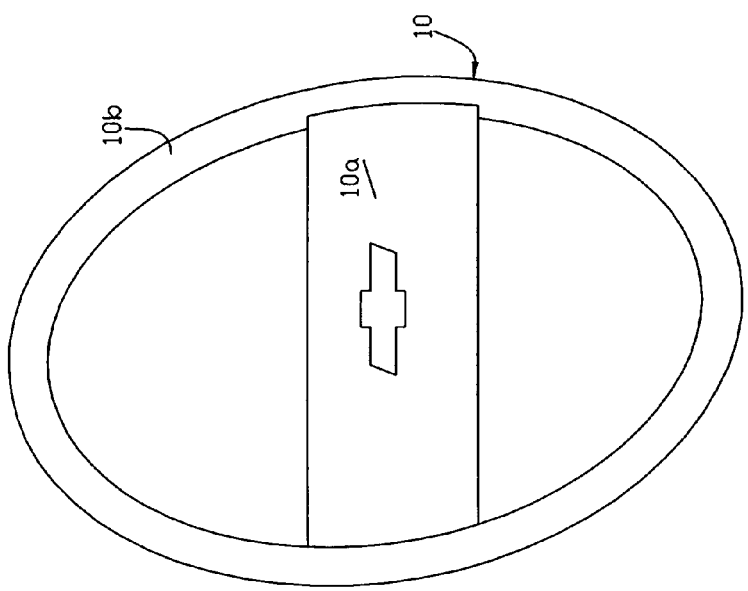
FIG. 1 is a perspective view of a common vehicle steering wheel.
Figure 4:
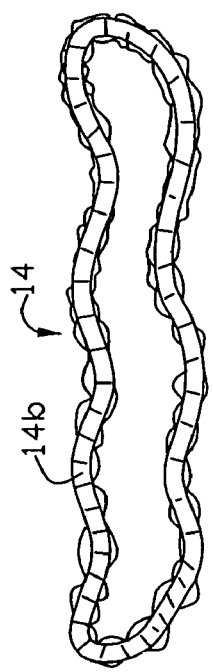
FIGS. 3 and 4 are side elevational and top plan views of another common prior art cover.
Figure 3:
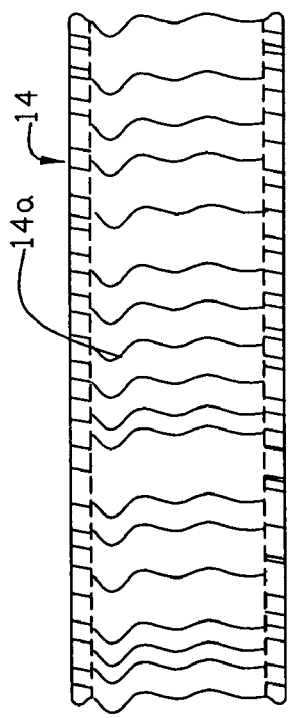
Figure 6:
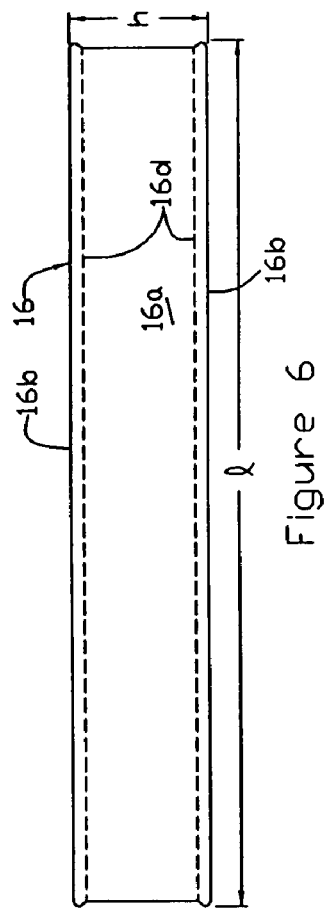
FIG. 6 is a top plan view of the cover of FIG. 5 in it's flat, relaxed state.
Figure 5:
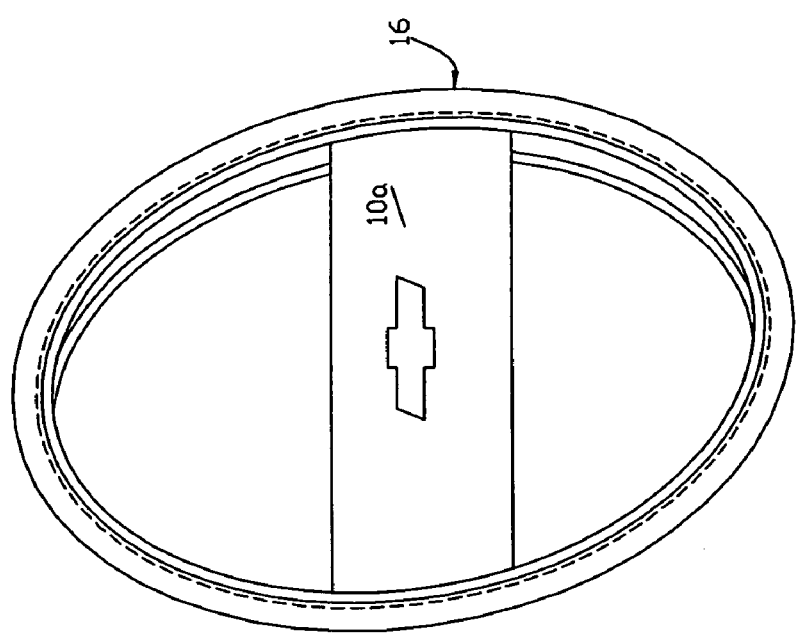
FIG. 5 is a perspective view of the steering wheel of FIG. 1 with a cover, in accordance with this invention placed there over.
Figure 9:
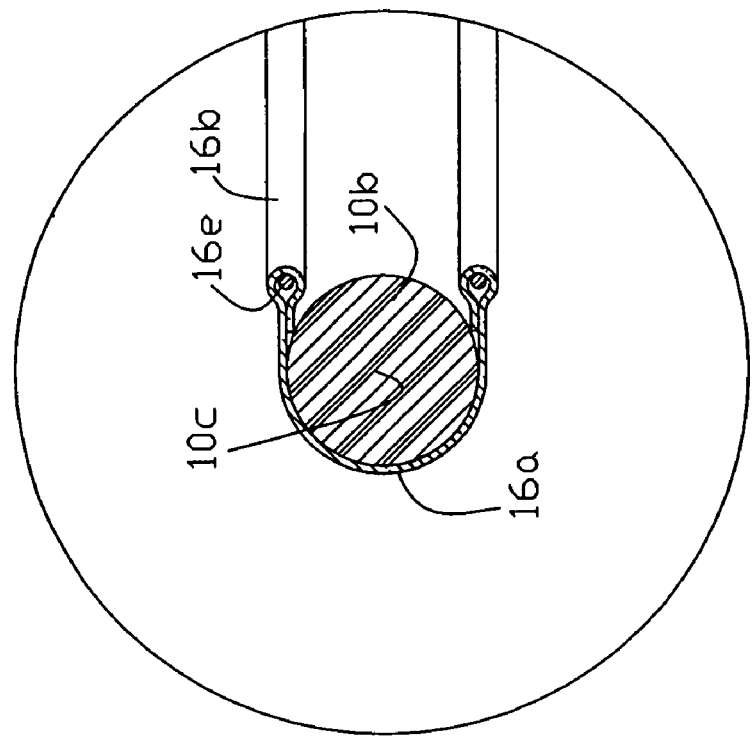
FIG. 9 is a blow-up cross-sectional view of the cover extending around the rim of a steering wheel.
Figure 8:
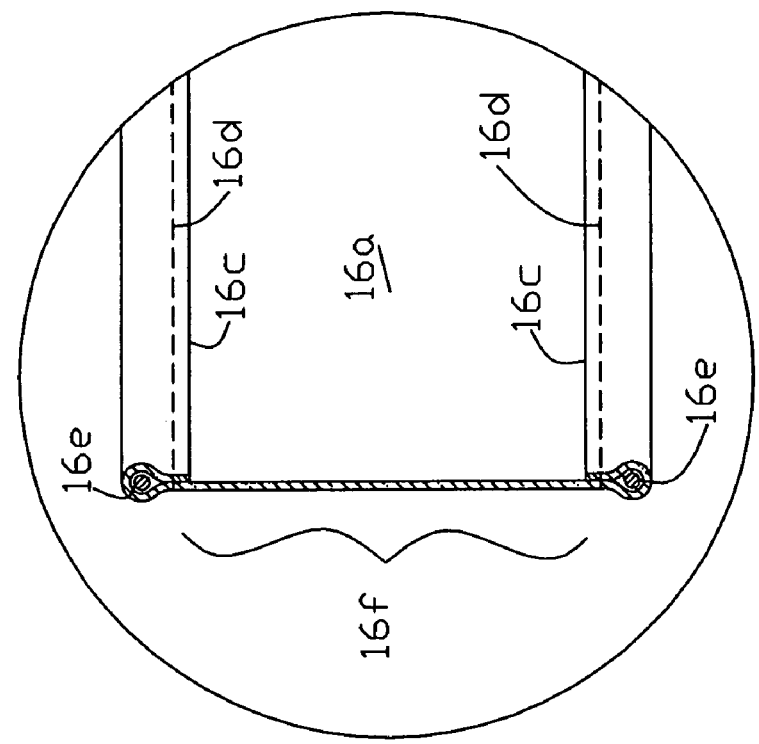
FIG. 8 is a broken away cross-sectional view of the cover of FIG. 5.

Referring now to FIG. 5, a steering wheel cover 16, in accordance with the present invention, is secured over the rim 10b of the steering wheel 10, of FIG. 1. The cover 16 is formed of an elongated endless flexible flat member, e.g., a band or strip 16a. An endless bungee cord is secured along each lateral edge 16b by folding over the band material and sewing the free end 16c back on the band forming a seam 16d along each edge enclosing an endless length of bungee cord 16e along each lateral edge. See FIGS. 6-9. The band or strap 16a of the cover, which may have a thickness of about 1-2 mm, is made of a plastic material and preferably of PVC to allow limited stretching to accommodate steering wheel rims having a nominal diameter, e.g, of 14" to 16". The height h and length l of the band 16a is preferably about 3¼" and 18¾" inches folded flat, respectively.

Figure 7:
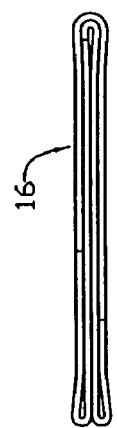
FIG. 7 is a side-elevational view of the cover of FIG. 6 folded over for packaging purposes.

Bungee cord, which is encapsulated within the lateral edges via the seams 16d, is made by stretching one and generally several or more strands, e.g., 12, of a natural or synthetic rubber and covering the rubber strands, while in their stretched state, with a fabric such as cotton or poly yarn. The net result is a cord, leaving the rubber in a prestressed state with the covering sheath preventing the rubber strands from fully retracting. As a result, the flat band 16 is preloaded along its edges and requires a preset force to begin to stretch it. The cord preferably has a diameter of about 2.0 to 5 mm, preferably 3.0 mm to 4.0 mm and most preferably about 3.5 mm in diameter. Such a cord has sufficient elasticity to allow the lateral edges of the band 16a to be stretched so that a central portion 16f of the band extends over the steering wheel rim with the lateral edges extending inwardly beyond the cross-sectional center point 10c of the rim to retain the cover in place while providing a firm fit between the cover and the rim as is illustrated in FIG. 5. This particular arrangement required a tensile force of about 10 pounds to begin stretching the cover. The cover lies flat in its unstretched or relaxed state for packaging and display purposes as is illustrated in FIG. 7.

There has been described a novel steering wheel cover which is relatively inexpensive, convenient to package and display and is user friendly with respect to installation. Modifications of the cover will undoubtedly occur to those skilled in the art without involving a departure from the spirit and scope of our invention as defined in the appended claims.

What is claimed is:

1. A cover for a steering wheel having a rim and a hub comprising:

an elongated, endless, resilient member having opposed lateral edges;

an endless bungee cord formed of rubber strands enclosed within a fabric sheath while in the stretched condition to leave the strands in their prestressed state, the cord being secured along each lateral edge of the member;

the member having a substantially flat, relaxed state from which the member may be stretched so that the central portion extends around the periphery of a steering wheel rim with the lateral edges extending inwardly beyond the cross-sectional mid point of the rim, the bungee cord being placed in tension to retain the cover in place.

2. The cover of claim 1 wherein the bungee cord has a diameter within the range of about 2.0 to 5.0 mm.

3. The cover of claim 2 wherein the bungee cord has a diameter within the range of about 3.0 to 4.0 mm.

4. The cover of claim 3 wherein the bungee cord has a diameter of about 3.5 mm.

5. The cover of claim 1 wherein the member is made of a plastic material.

6. The cover of claim 5 wherein the member is made of PVC.

7. A steering wheel cover comprising:

an elongated endless flexible member of limited stretchability having opposed lateral edges;

an endless bungee cord formed of rubber strands enclosed with a fabric sheath to maintain the strands in the prestressed state, the cord being encapsulated within a seam along each lateral edge of the member;

the member having a height h and a substantially flat relaxed state from which the member may be stretched so that the central portion extends around the periphery of the steering wheel rim with the lateral edges extending inwardly beyond the cross-sectional mid point of the rim, the bungee cord being placed in tension to maintain the cover in place.

* * * * *